US007499053B2

(12) United States Patent
Keller et al.

(10) Patent No.: US 7,499,053 B2
(45) Date of Patent: Mar. 3, 2009

(54) REAL-TIME PRECISION RAY TRACING

(75) Inventors: Alexander Keller, Ulm (DE); Carsten Waechter, Ulm (DE)

(73) Assignee: Mental Images GmbH, Berlin (DE)

( * ) Notice: Subject to any disclaimer, the term of this patent is extended or adjusted under 35 U.S.C. 154(b) by 81 days.

(21) Appl. No.: 11/474,517

(22) Filed: Jun. 23, 2006

(65) Prior Publication Data

US 2007/0024615 A1 Feb. 1, 2007

Related U.S. Application Data

(63) Continuation-in-part of application No. 10/299,574, filed on Nov. 19, 2002, now Pat. No. 7,184,042, which is a continuation-in-part of application No. 09/884,861, filed on Jun. 19, 2001, now Pat. No. 7,227,547.

(60) Provisional application No. 60/693,231, filed on Jun. 23, 2005, provisional application No. 60/265,934, filed on Feb. 1, 2001, provisional application No. 60/212,286, filed on Jun. 19, 2000.

(51) Int. Cl.
*G06T 15/50* (2006.01)
*G06T 15/60* (2006.01)

(52) U.S. Cl. ..................................... 345/426
(58) Field of Classification Search ................. None
See application file for complete search history.

(56) References Cited

U.S. PATENT DOCUMENTS

| 5,305,430 | A |   | 4/1994  | Glassner |        |
|-----------|---|---|---------|----------|--------|
| 5,847,711 | A |   | 12/1998 | Kaufman  |        |
| 5,933,146 | A | * | 8/1999  | Wrigley  | 345/420 |
| 5,973,699 | A | * | 10/1999 | Kent     | 345/419 |
| 6,028,606 | A |   | 2/2000  | Kolb     |        |
| 6,172,679 | B1|   | 1/2001  | Lim      |        |
| 6,529,193 | B1|   | 3/2003  | Herken   |        |

(Continued)

OTHER PUBLICATIONS

Vlastimil Havran, "Heurisitic Ray Shooting," Nov. 2000, Ph.D. Thesis, Czech Technical University, Prague, Chapters 1, 4, p. 1-20, 49-91.*

(Continued)

*Primary Examiner*—Ulka Chauhan
*Assistant Examiner*—Jason M Repko
(74) *Attorney, Agent, or Firm*—Jacobs & Kim LLP; David Jacobs (57) ABSTRACT

Systems and techniques are described for ray tracing and for the efficient construction of acceleration data structures required for fast ray tracing. A computer graphics system generates, for each pixel in an image, a pixel value that is representative of a point in a scene as recorded on an image plane of a simulated camera. The computer graphics system is configured to generate the pixel value for an image using a selected ray-tracing methodology. The selected ray-tracing methodology includes the use of a ray tree that includes at least one ray shot from the pixel into a scene along a selected direction. The ray-tracing methodology further includes calculating the intersections of rays and surfaces in the scene. An axis-aligned bounding box is defined that contains, for a given ray, the point of intersection of the ray and surface nearest the origin of the ray. The bounding box is iteratively refined until a predetermined termination criterion has been met.

10 Claims, 8 Drawing Sheets

U.S. PATENT DOCUMENTS

| | | | |
|---|---|---|---|
| 6,825,839 | B2 | 11/2004 | Huang |
| 6,862,026 | B2 | 3/2005 | Zachmann |
| 6,868,420 | B2 * | 3/2005 | Perry et al. ............... 707/100 |
| 6,956,570 | B2 * | 10/2005 | Munshi ..................... 345/426 |
| 7,002,571 | B2 * | 2/2006 | Lake et al. ................. 345/420 |
| 7,138,998 | B2 * | 11/2006 | Forest et al. ............... 345/423 |
| 7,164,420 | B2 * | 1/2007 | Ard .......................... 345/423 |
| 2003/0034968 | A1 | 2/2003 | Abramov |
| 2003/0052874 | A1 | 3/2003 | Abramov |
| 2004/0125103 | A1 | 7/2004 | Kaufman |
| 2005/0146522 | A1 * | 7/2005 | Maillot ..................... 345/423 |

OTHER PUBLICATIONS

William Martin, Elaine Cohen, Russell Fish, Peter Shirley, "Practical Ray Tracing of Trimmed NURBS Surfaces," Sep. 2000, Journal of Graphics Tools, vol. 5, No. 1, p. 27-52.*

Andrew Woo, "Ray Tracing Polygons using Spatial Subdivision," May 1992, Graphics Interface '92, p. 184-191.*

Jonas Lext and Tomas Akenine-Möller, "Towards Rapid Reconstruction for Animated Ray Tracing," 2001, Eurographics 2001—Short Presentations.*

Andrew Woo, Andrew Pearce, and Marc Ouellette, "It's Really Not a Rendering Bug, You See . . . ," Sep. 1996, Computer Graphics and Applications, IEEE, vol. 16, No. 5, p. 21-25.*

Michael Herf, "Robust Epsilons in Floating Point," Apr. 5, 2000 [online], [retrieved on Feb. 7, 2008], Retrieved from the Internet <URL: http://www.stereopsis.com/robusteps.html>.*

Keller, "Strictly Deterministic Sampling Methods in Computer Graphics", Feb. 8, 2001. http://graphics.uni-uml.de.

Keller, "Instantly Radiosity", Proceedings of the 24th Annual Conference on Computer Graphics and Interactive Techniques. ACM Press/Addison-Wesley Publishing Co. 1997.

Gaede, "Multidimensional Access Methods", ACM Computing Surveys, vol. 30, No. 2, Jun. 1998.

Zachmann, "Minimal Hierarchical Collision Detection", ACM 2002.

IBM Technical Disclosure Bulletin "Quasi-Monte Carlo Rendering With Adaptive Sampling," vol. 39, No. 9, Sep. 1, 1996, pp. 215-224.

* cited by examiner

REAL-TIME PRECISION RAY TRACING

CROSS-REFERENCE TO RELATED APPLICATIONS

The present application is a Continuation-In-Part of U.S. patent application Ser. No. 10/299,574 filed Nov. 19, 2002 (issued as U.S. Pat No. 7,184,042), which is a Continuation-In-Part of U.S. Ser. No. 09/884,861 filed Jun. 19, 2001 (issued as U.S. Pat. No. 7,227,547), which claims priority benefit from provisional applications No. 60/265,934 filed Feb. 1, 2001 (expired) and 60/212,286 filed Jun. 19, 2000 (expired) each of which is incorporated by reference.

The present application claims the benefit of United States Provisional Patent Application Ser. No. 60/693,231, filed on Jun. 23, 2005 (expired), which is hereby incorporated by reference in its entirety.

REFERENCE TO COMPUTER PROGRAM APPENDIX

Submitted herewith is a source code listing, which is incorporated herein in its entirety. The source code listing is referred to herein as the "Appendix," and is organized into sections identified by a three-digit reference number in the format "1.1.1."

BACKGROUND OF THE INVENTION

1. Field of the Invention

The present invention relates generally to methods and systems for image rendering in and by digital computing systems, such as for motion pictures and other applications, and in particular, relates to methods, systems, devices, and computer software for real-time, precision ray tracing.

2. Description of Prior Art

The term "ray tracing" describes a technique for synthesizing photorealistic images by identifying all light paths that connect light sources with cameras and summing up these contributions. The simulation traces rays along the line of sight to determine visibility, and traces rays from the light sources in order to determine illumination.

Ray tracing has become mainstream in motion pictures and other applications. However, current ray tracing techniques suffer from a number of known limitations and weaknesses, including numerical problems, limited capabilities to process dynamic scenes, slow setup of acceleration data structures, and large memory footprints. Thus, current ray tracing techniques lack the capability to deal efficiently with fully animated scenes, such as wind blowing through a forest or a person's hair. Overcoming the limitations of current ray tracing systems would also enable the rendering of, for example, higher quality motion blur in movie productions.

Current attempts to improve the performance of ray tracing systems have fallen short for a number of reasons. For example, current real-time ray tracing systems generally use 3D-trees as their acceleration structure, which are based on axis-aligned binary space partitions. Because the main focus of these systems is on rendering static scenes, they typically fail to address the significant amount of setup time required to construct the required data structures in connection with fully animated scenes. Along these lines, one manufacturer has improved real-time ray tracing by building efficient 3D-trees and developing an algorithm able to shorten the time needed to traverse the tree. However, it can be shown that the expected memory requirement for the system increases quadratically with an increase in the number of objects to be ray-traced.

Another manufacturer has designed a ray tracing integrated circuit that uses bounding volume hierarchies to improve system performance. However, it has been found that the architecture's performance breaks down if too many incoherent secondary rays are traced.

In addition, attempts have made to improve system performance by implementing 3D-tree traversal algorithms using field-programmable gate arrays (FPGAs). The main increase in processing speed in these systems is obtained by tracing bundles of coherent rays and exploiting the capability of FPGAs to perform rapid hardwired computations. The construction of acceleration structures has not yet been implemented in hardware. The FPGA implementations typically use floating point techniques at reduced precision.

SUMMARY OF THE INVENTION

Aspects of the present invention provide precise, high-performance techniques, as well as methods, systems and computer software implementing such techniques, that address the issues noted above, and that are also readily adaptable to current ray tracing devices. The techniques described herein have a memory footprint that increases linearly with an increase in the number of objects to be ray-traced. In an amortized analysis, the described techniques outperform current real-time ray tracing techniques.

A first aspect of the present invention is directed to a technique for utilizing bounding volume hierarchies in a manner highly adapted to real-time ray tracing.

Another aspect of the present invention addresses the issue of self-intersection in ray tracing. A technique is described below wherein, after computing the intersection point of a ray and a surface, the computed point is used, along with the ray direction, to re-compute the ray/surface intersection point, thereby providing an iteration that increases precision.

Another aspect of the present invention enables high performance 3D-tree construction via optimizations in splitting plane selection, minimum storage construction, and tree pruning via approximate left-balancing.

Another aspect of the invention involves the use of high-performance bounding volume hierarchies wherein, instead of explicitly representing axis-aligned bounding boxes, the system implicitly represents axis-aligned bounding boxes by a hierarchy of intervals. In one implementation, given a list of objects and an axis-aligned bounding box, the system determines L- and R-planes and partitions the set of objects accordingly. Then the system processes the left and right objects recursively until some termination criterion is met. Since the number of inner nodes is bounded, it is safe to rely on termination when there is only one object remaining.

Another aspect of the invention involves efficiently determining a splitting plane M via a 3D-tree construction technique described herein, and then partitioning the objects such that the overlap of the resulting L- and R-planes of the new axis-aligned bounding boxes is minimally overlapping the suggested splitting plane M.

DETAILED DESCRIPTION

The present invention provides improved techniques for ray tracing, and for the efficient construction of acceleration data structures required for fast ray tracing. The following discussion describes methods, structures and systems in accordance with these techniques.

It will be understood by those skilled in the art that the described methods and systems can be implemented in software, hardware, or a combination of software and hardware, using conventional computer apparatus such as a personal computer (PC) or equivalent device operating in accordance with, or emulating, a conventional operating system such as Microsoft Windows, Linux, or Unix, either in a standalone configuration or across a network. The various processing means and computational means described below and recited in the claims may therefore be implemented in the software and/or hardware elements of a properly configured digital processing device or network of devices. Processing may be performed sequentially or in parallel, and may be implemented using special purpose or reconfigurable hardware.

Figure 1:
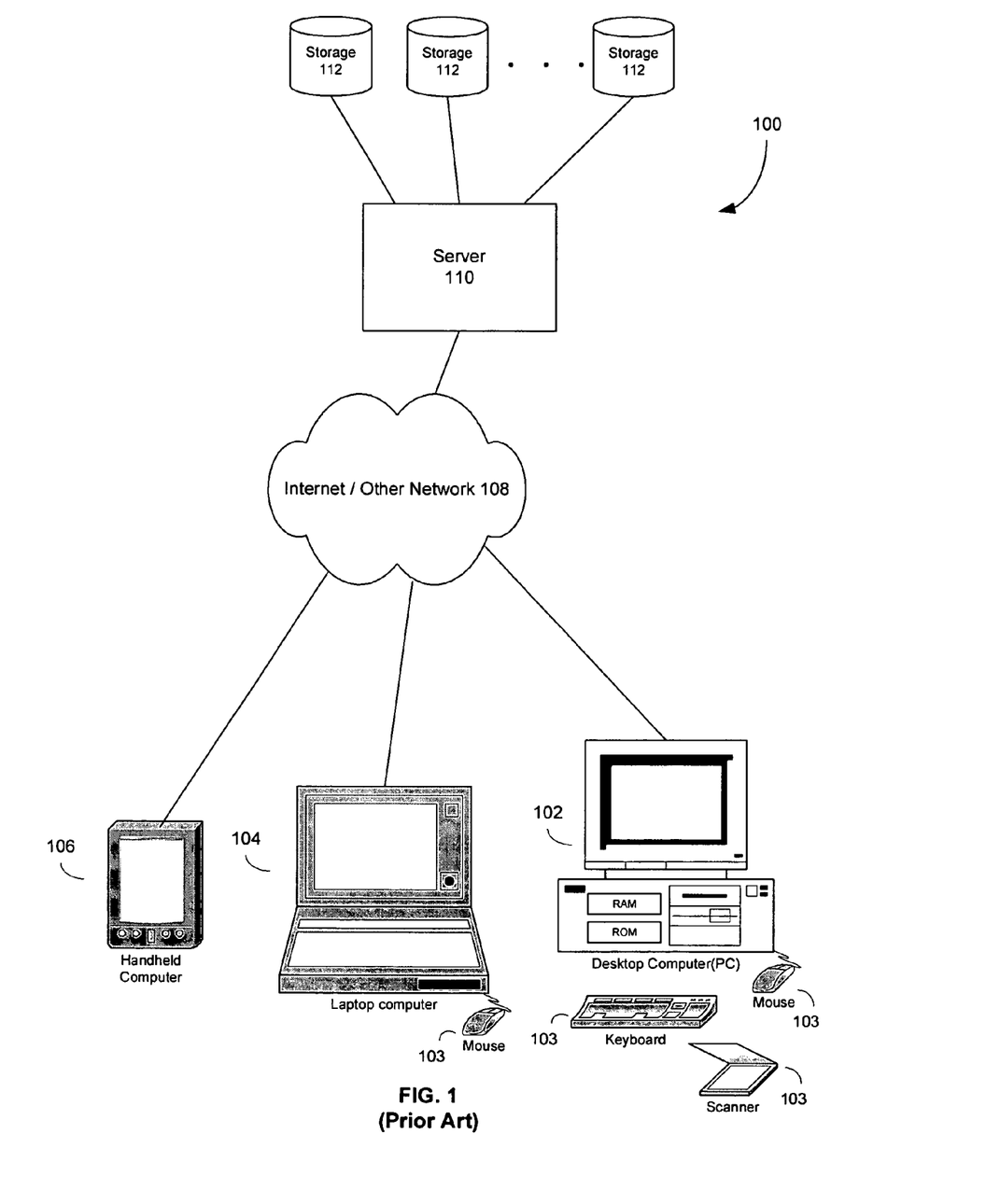
FIG. 1 is a schematic diagram of a conventional digital processing system in which the present invention can be deployed.

Methods, devices or software products in accordance with the invention can operate on any of a wide range of conventional computing devices and systems, such as those depicted by way of example in FIG. 1 (e.g., network system 100), whether standalone, networked, portable or fixed, including conventional PCs 102, laptops 104, handheld or mobile computers 106, or across the Internet or other networks 108, which may in turn include servers 110 and storage 112.

Figure 2:
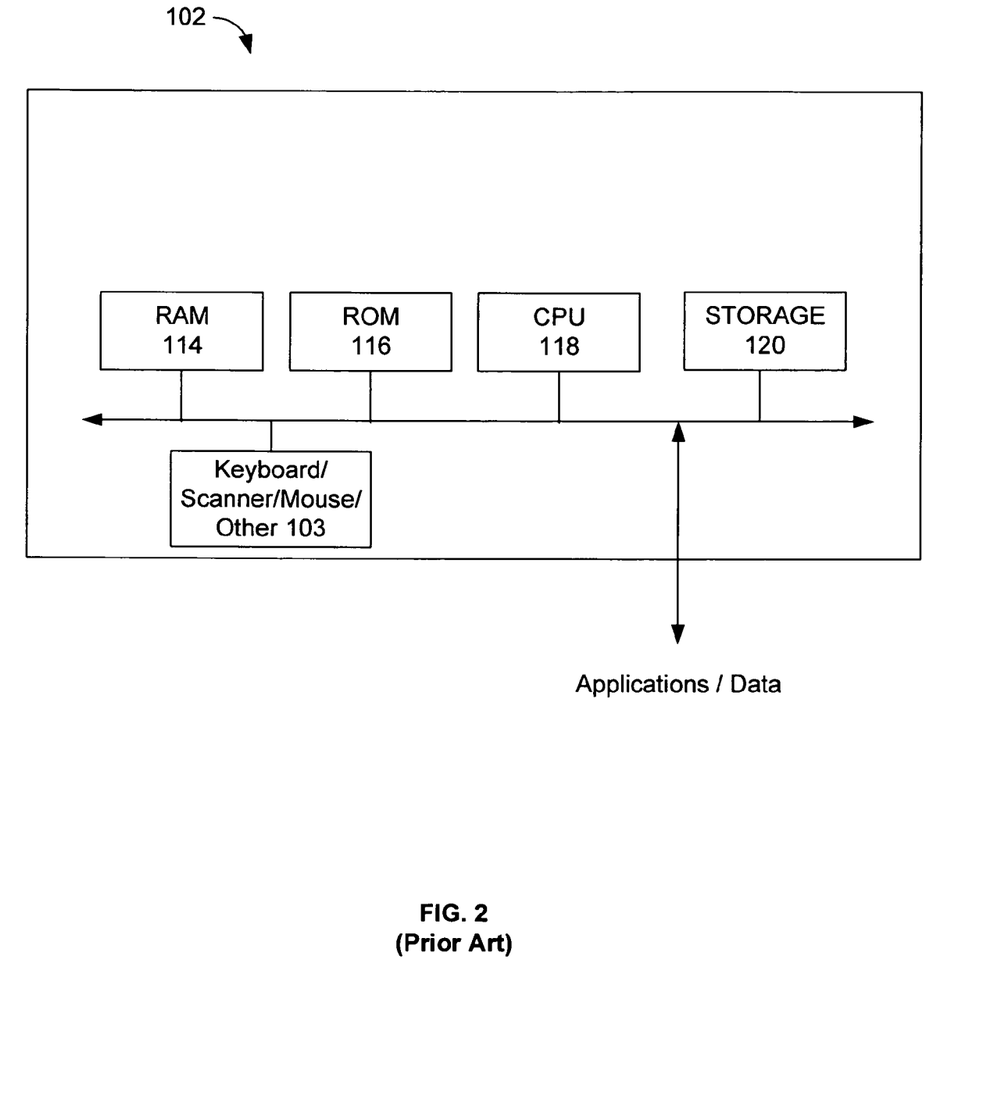
FIG. 2 is a schematic diagram of a conventional personal computer, or like computing apparatus, in which the present invention can be deployed.

In line with conventional computer software and hardware practice, a software application configured in accordance with the invention can operate within, e.g., a PC 102 like that shown in FIG. 2, in which program instructions can be read from a CD-ROM 116, magnetic disk or other storage 120 and loaded into RAM 114 for execution by CPU 118. Data can be input into the system via any known device or means, including a conventional keyboard, scanner, mouse or other elements 103.

Figure 3:
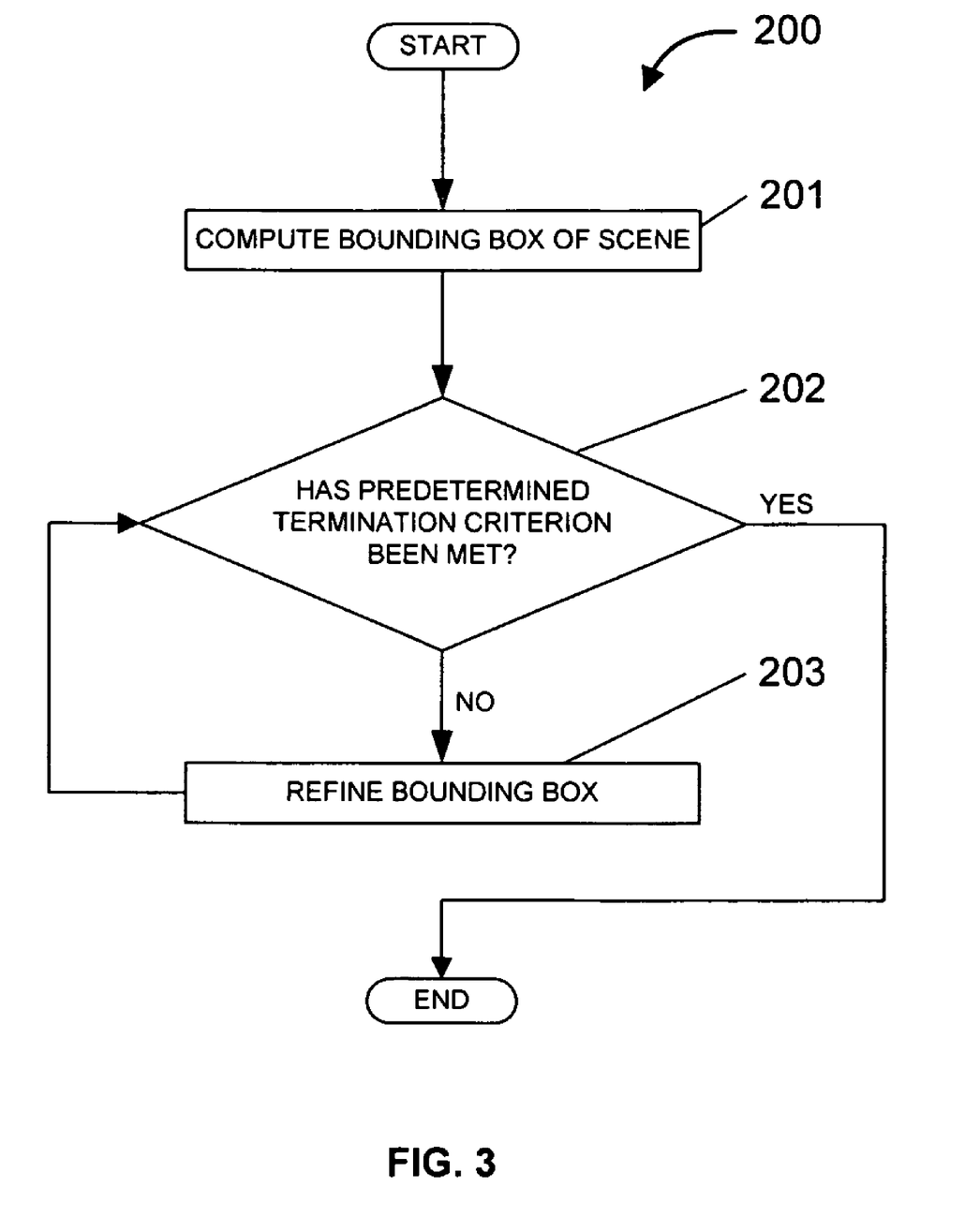
FIG. 3 is a diagram illustrating an overall method in accordance with a first aspect of the present invention.

FIG. 3 is a diagram depicting an overall method 200 in accordance with an aspect of the present invention. The method is practiced in the context of a computer graphics system, in which a pixel value is generated for each pixel in an image. Each generated pixel value is representative of a point in a scene as recorded on an image plane of a simulated camera. The computer graphics system is configured to generate the pixel value for an image using a selected ray-tracing methodology. The selected ray-tracing methodology includes the use of a ray tree that includes at least one ray shot from the pixel into a scene along a selected direction, and further includes calculations of the intersections of rays and objects (and/or surfaces of objects) in the scene.

In the FIG. 3 method 200, bounding volume hierarchies are used to calculate the intersections of rays and surfaces in the scene. In step 201, a bounding box of a scene is computed. In step 202, it is determined whether a predetermined termination criterion is met. If not, then in step 203 the axis-aligned bounding box is refined. The process continues recursively until the termination criterion is met. According to an aspect of the invention, the termination criterion is defined as a condition at which the bounding box coordinates differ only in one unit of resolution from a floating point representation of the ray/surface intersection point. However, the scope of the present invention extends to other termination criteria.

The use of bounding volume hierarchies as an acceleration structure is advantageous for a number of reasons. The memory requirements for bounding volume hierarchies can be linearly bounded in the number of objects to be ray traced. Also, as described below, bounding volume hierarchies can be constructed much more efficiently than 3D-trees, which makes them very suitable for an amortized analysis, as required for fully animated scenes.

Figure 4:
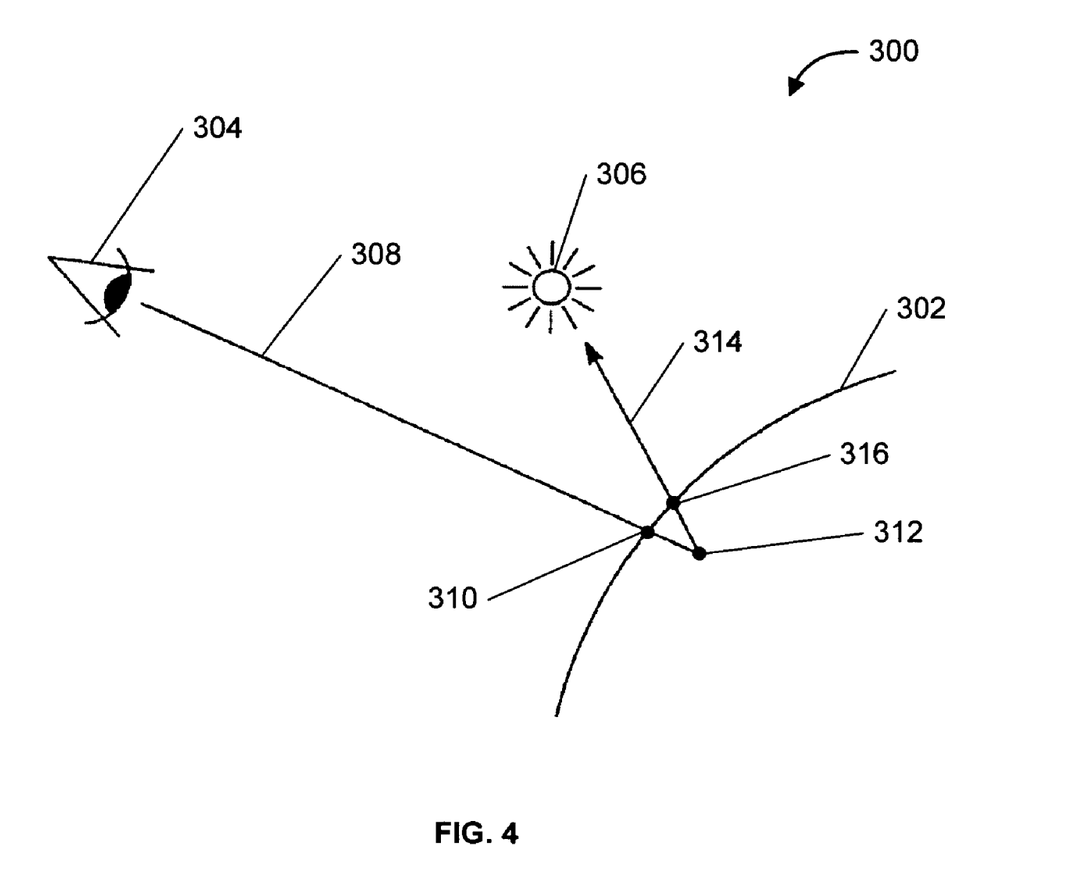
FIG. 4 is diagram of a ray tracing procedure, illustrating the problem of self-intersection.

The following discussion describes in greater detail certain issues in ray tracing technology, and particular aspects of the invention that address those issues. FIG. 4 is a diagram illustrating the "self-intersection" problem. FIG. 4 shows a ray tracing procedure 300, including an image surface 302, an observation point 304, and a light source 306. In order to synthesize an image of the surface, a series of computations are performed in order to locate rays extending between the observation point 304 and the surface 302. FIG. 4 shows one such ray 308. Ideally, there is then calculated the exact point of intersection 310 between the ray 308 and the surface 302.

However, due to floating point arithmetic computations on computers, it is sometimes possible for the calculated ray/surface intersection point 312 to be different from the actual intersection point 310. Further, as illustrated in FIG. 4, it is possible for the calculated point 312 to be located on the "wrong" side of the surface 302. In that case, when computations are performed to locate a secondary ray 314 extending from the calculated ray/surface intersection point 312 to the light source 306, these computations indicate that the secondary ray 314 hits the surface 302 at a second intersection point 316 rather than extending directly to the light source 306, thus resulting in an imaging error.

One known solution to the self-intersection problem is to start each ray 308 at a safe distance from the surface 302. This safe distance is typically expressed as a global floating point e. However, the determination of the global floating point E depends heavily on the scene, and the particular location within the scene itself, for which an image is being synthesized.

An aspect of the invention provides a more precise alternative. After arriving at a calculated ray/surface intersection point 312, the calculated point 312 and the direction of the ray 308 are then used to re-compute an intersection point that is closer to the actual intersection point 310. This re-computation of the intersection point is incorporated into the ray tracing technique as an iteration that increases precision. If the iteratively computed intersection point turns out to be on the "wrong" side of the surface 302, it is moved to the "correct" side of the surface 302. The iteratively computed intersection point can be moved along the surface normal, or along the axis determined by the longest component of the normal. Instead of using a global floating point $\epsilon$, the point is moved by an integer $\epsilon$ to the last bits of the floating point mantissas.

The described procedure avoids computations in double precision and has the advantage that it implicitly adapts to the scale of the floating point number, which is determined by its exponent. Thus, in this implementation, all secondary rays directly start from these modified points making an ε-offset unnecessary. During intersection computation, it can therefore be assumed that the ray interval of validity to begin at 0 rather than some offset.

Modifying the integer representation of the mantissa also avoids numerical problems when intersecting a triangle and a plane in order to decide which points are on what side.

Exploiting the convex hull property of convex combinations, intersections of rays and freeform surfaces can be found by refining an axis-aligned bounding box, which contains the point of intersection nearest to the ray origin. This refinement can be continued until the resolution of floating point numbers is reached, i.e., until the bounding box coordinates differ only in one unit of resolution from the floating point representation. The self-intersection problem then is avoided by selecting the bounding box corner that is closest to the surface normal in the center of the bounding box. This corner point then is used to start the secondary ray. This "ray object intersection test" is very efficient and benefits from the avoidance of the self-intersection problem.

After constructing the acceleration data structure, the triangles are transformed in-place. The new representation encodes degenerate triangles so that the intersection test can handle them without extra effort. It of course is also possible to just prevent degenerate triangles to enter the graphics pipeline. Sections 2.2.1 and 2.2.2 of the Appendix set forth listings of source code in accordance with the present aspect of the invention.

The test first determines the intersection of the ray and the plane of the triangle and then excludes intersections outside the valid interval ]0, result.tfar] on the ray. This is achieved by only one integer test. Note that the +0 is excluded from the valid interval. This is important if denormalized floating point numbers are not supported. If this first determination is successful, the test proceeds by computing the Barycentric coordinates of the intersection. Note that again only an integer test, i.e., more specifically only testing two bits, is required to perform the complete inclusion test. Thus the number of branches is minimal. In order to enable this efficient test, the edges and the normal of the triangle are scaled appropriately in the transformation step.

The precision of the test is sufficient to avoid wrong or missed ray intersections. However, during traversal situations may occur in which it is appropriate to extend the triangles for a robust intersection test. This can be done before transforming the triangles. Since the triangles are projected along the axis identified by the longest component of their normal, this projection case has to be stored. This is achieved by counters in the leaf nodes of the acceleration data structure: The triangle references are sorted by the projection case and a leaf contains a byte for the number of triangles in each class.

A further aspect of the present invention provides an improved approach for constructing acceleration data structures for ray tracing. Compared with prior software implementations that follow a number of different optimizations, the approach described herein yields significantly flatter trees with superior ray tracing performance.

Candidates for splitting planes are given by the coordinates of the triangle vertices inside the axis-aligned bounding box to be partitioned. Note that this includes vertices that actually lie outside the bounding box, but have at least one coordinate that lies in one of the three intervals defined by the bounding box. Out of these candidates, there is selected the plane closest to middle of the longest side of the current axis-aligned bounding box. A further optimization selects only coordinates of triangles whose longest component of the surface normal matches the normal of the potential splitting plane. This procedure yields much flatter trees, since placing splitting planes through the triangle vertices implicitly reduces the number of triangles split by splitting planes. In addition, the surface is approximated tightly and empty space is maximized. If the number of triangles is higher than a specified threshold and there are no more candidates for splitting planes, the box is split in the middle along its longest side. This avoids inefficiencies of other approaches, including the use, for example, of long diagonal objects.

The recursive procedure of deciding which triangles belong to the left and right child of a node in the hierarchy has typically required extensive bookkeeping and memory allocation. There is a much simpler approach that only fails in exceptional cases. Only two arrays of references to the objects to be ray traced are allocated. The first array is initialized with the object references. During recursive space partition, a stack of the elements on the left is grown from the beginning of the array, while the elements, which are classified right, are kept on a stack growing from the end of the array towards the middle. In order to be able to quickly restore the elements that are intersecting a split plane, i.e., are both left and right, the second array keeps a stack of them. Thus backtracking is efficient and simple.

Instead of pruning branches of the tree by using the surface area heuristic, tree depth is pruned by approximately left-balancing the binary space partition starting from a fixed depth. As observed by exhaustive experimentation, a global fixed depth parameter can be specified across a vast variety of scenes. This can be understood by observing that after a certain amount of binary space partitions usually there remain connected components that are relatively flat in space. Section 2.3.1 of the Appendix sets forth a listing of source code in accordance with this aspect of the invention.

Using bounding volume hierarchies, each object to be ray traced is referenced exactly once. As a consequence, and in contrast with 3D-trees, no mailbox mechanisms are required to prevent the multiple intersection of an object with a ray during the traversal of the hierarchy. This is a significant advantage from the viewpoint of system performance and makes implementations on a shared memory system much simpler. A second important consequence is that there cannot be more inner nodes in the tree of a bounding volume hierarchy than the total number of objects to be ray-traced. Thus the memory footprint of the acceleration data structure can be linearly bounded in the number of objects before construction. Such an a priori bound is not available for the construction of a 3D-tree, where the memory complexity is expected to increase quadratically with the number of objects to be ray-traced.

Thus, there is now described a new concept of bounding volume hierarchies that are significantly faster than current 3D-tree ray tracing techniques, and in which the memory requirements grow linearly, rather than expected quadratically, with the number of objects to be ray-traced. The core concept that allows bounding volume hierarchies to outperform 3D-trees is to focus on how space can be partitioned, rather than focusing on the bounding volumes themselves.

Figure 5:
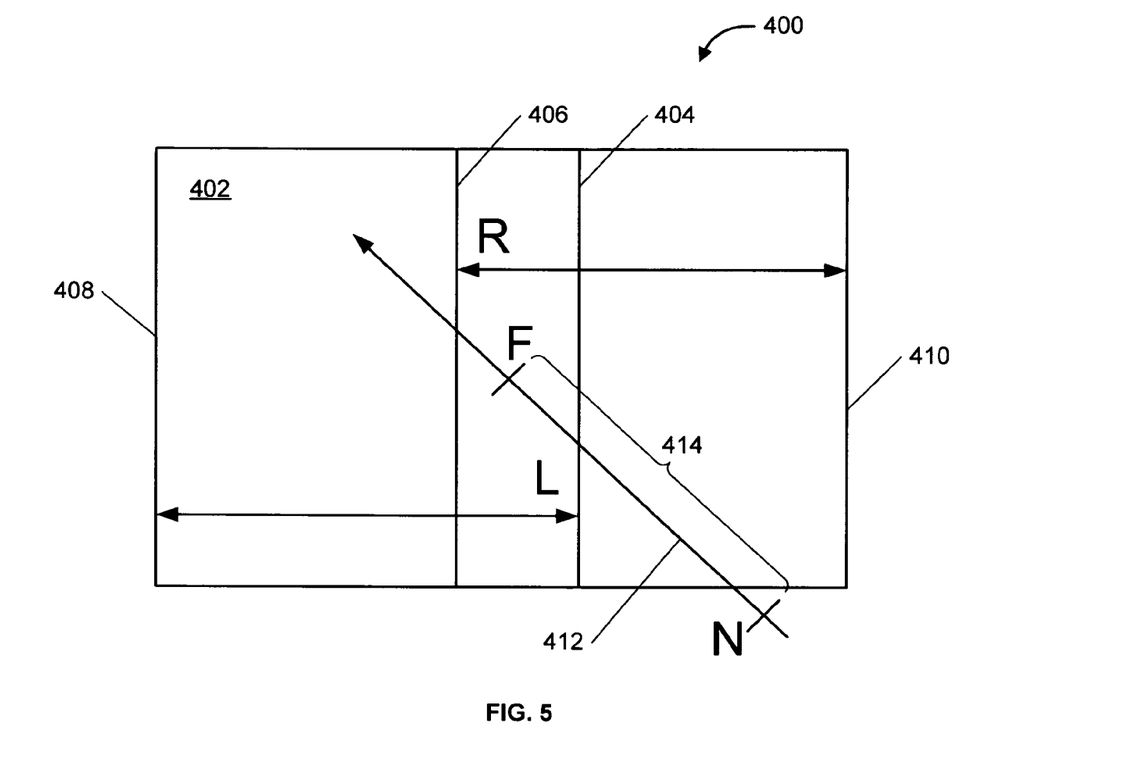
FIG. 5 shows a diagram, in elevation view, of a partitioned axis-aligned bounding box that is used as an acceleration data structure in accordance with a further aspect of the invention.

In a 3D-tree, a bounding box is partitioned by a single plane. According to the present aspect of the invention, two parallel planes are used to define two axis-aligned bounding boxes. FIG. 5 is a diagram illustrating the principal data structure 400.

FIG. 5 shows an axis-aligned bounding box 402, in elevation view. An L-plane 404 and an R-plane 406, which are axis-aligned and parallel with each other, are used to partition bounding box 402 into left and right axis-aligned bounding boxes. The left bounding box extends from the left wall 408 of the original bounding box 402 to the L-plane 404. The right bounding box extends from the R-plane 406 to the right wall 410 of the original bounding box 402. Thus, the left and right bounding boxes overlap each other. The traversal of ray 412 is determined by the positions of intersection with the L- and R-planes 404 and 406 relative to the interval of validity [N, F] 414 of the ray 412. In the FIG. 5 data structure 400, the L- and R-planes 404 and 406 are positioned with respect to each other to partition the set of objects contained within the original bounding box 402, rather than the space contained within the bounding box 402. In contrast with a 3D-tree partition, having two planes offers the possibility of maximizing the empty space between the two planes. Consequently, the boundary of the scene can be approximated much faster.

Figures 6, 7:
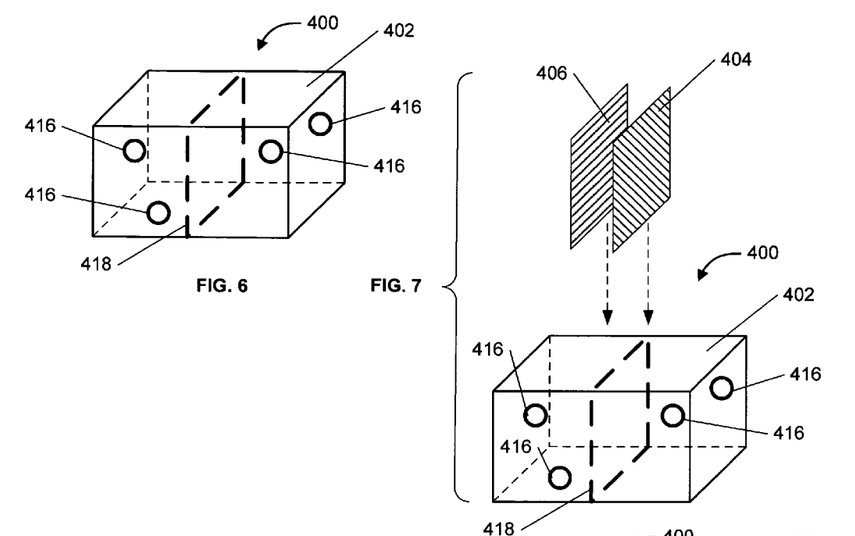
FIGS. 6-8 are a series of diagrams, in isometric view, of the axis-aligned bounding box shown in FIG. 5, illustrating the partitioning of the bounding box with L- and R-planes.
Figure 8:
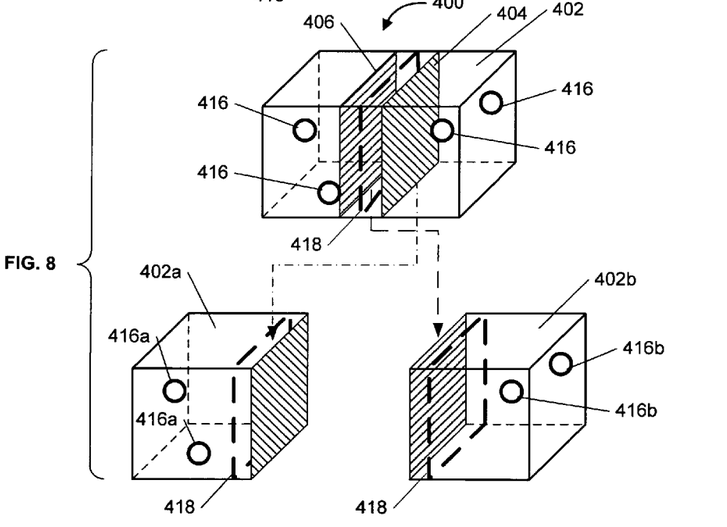

FIGS. 6-8 are a series of three-dimensional diagrams further illustrating data structure 400. FIG. 6 shows a diagram of bounding box 402. For purposes of illustration, virtual objects within bounding box 402 are depicted as abstract circles 416. As shown in FIGS. 7 and 8, L-plane 404 and R-plane 406 are then used to partition bounding box 402 into a left bounding box 402a and a right bounding box 402b. The L- and R-planes are selected such that the empty space between them is maximized. Each virtual object 416 ends up in either the left bounding box 402a or the right bounding box 402b. As shown at the bottom of FIG. 8, the virtual objects 416 are partitioned into "left" objects 416a and "right" objects 416b. Each of the resulting bounding boxes 402a and 402b are themselves partitioned, and so on, until a termination criterion has been satisfied.

Figure 9:
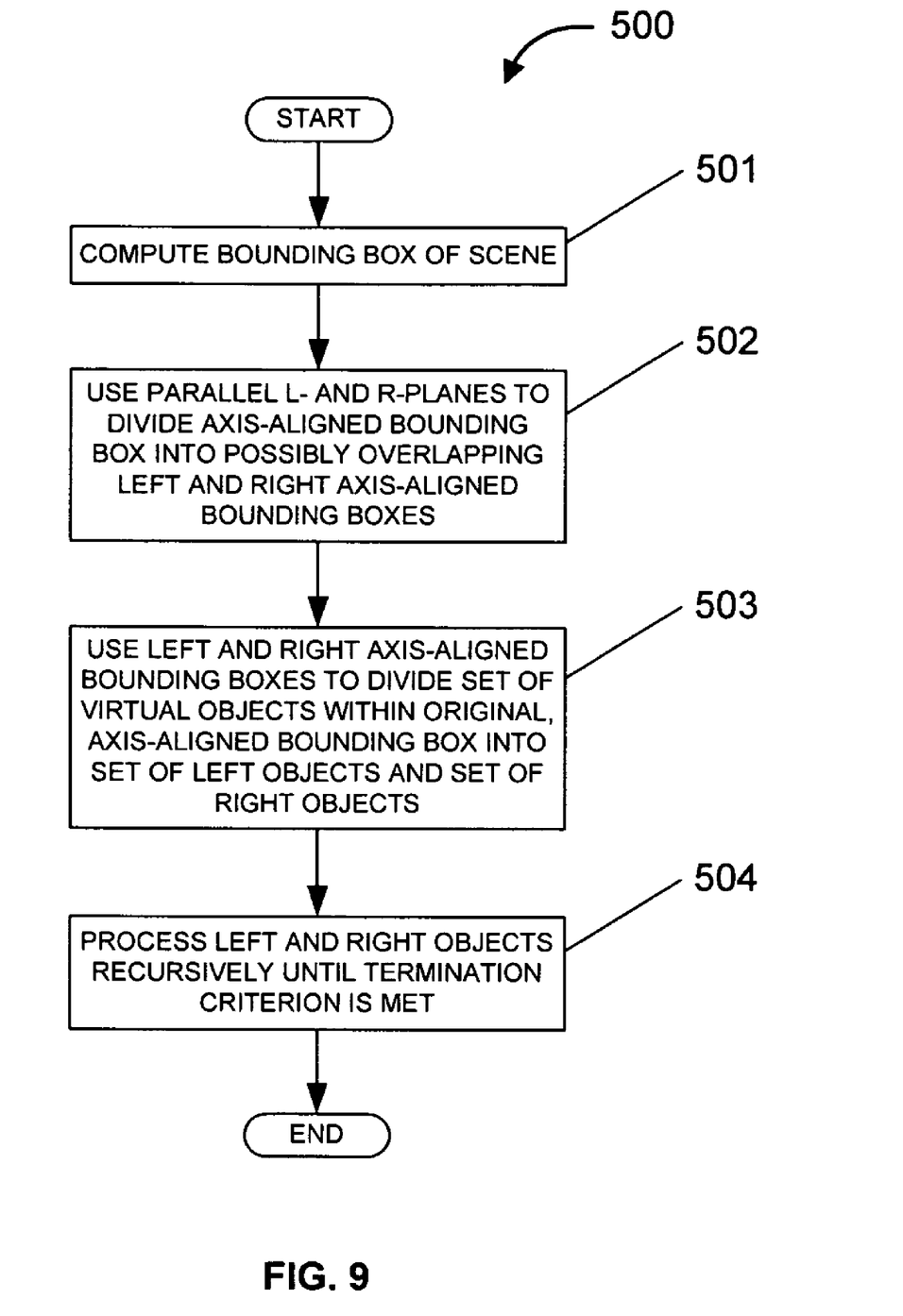
FIGS. 9 and 10 are flowcharts of ray tracing methods according to further aspects of the invention.

FIG. 9 is a flowchart of the described method 500. In step 501, a bounding box of a scene is computed. In step 502, parallel L- and R-planes are used to partition the axis-aligned bounding box left and right axis-aligned bounding boxes, which may overlap. In step 503, the left and right bounding boxes are used to partition the set of virtual objects contained with the original axis-aligned bounding box into a set of left objects and a set of right objects. In step 504, the left and right objects are processed recursively until a termination criterion is met.

Instead of one split parameter, used in earlier implementations, two split parameters are stored within a node. Since the number of nodes is linearly bounded by the number of objects to be ray traced, an array of all nodes can be allocated once. Thus, the costly memory management of 3D-trees during construction becomes unnecessary.

The construction technique is much simpler than the analog for 3D-tree construction and is easily implemented in a recursive way, or by using an iterative version and a stack. Given a list of objects and an axis-aligned bounding box, the L- and R-planes are determined, and the set of objects is determined accordingly. The left and right objects are then processed recursively until some termination criterion is met. Since the number of inner nodes is bounded, it is safe to rely on termination when there is only one object left.

It should be noted that the partition only relies on sorting objects along planes that are perpendicular to the x-, y-, and z-axes, which is very efficient and numerically absolutely stable. In contrast with 3D-trees, no exact intersections of objects with splitting planes need to be computed, which is more costly and hard to achieve in a numerically robust way. Numerical problems of 3D-trees, such as missed triangles at vertices and along edges, can be avoided by extending the triangles before the construction of the bounding volume hierarchy. Also, in a 3D-tree, overlapping objects have to be sorted both into the left and right axis-aligned bounding boxes, thereby causing an expected quadratic growth of the tree.

Various techniques may be used to determine the L- and R-planes, and thus the actual tree layout. Returning to FIGS. 6-8, one technique is to determine a plane M 418 using the 3D-tree construction technique described above and partition the objects such that the overlap of the resulting L-plane and R-plane of the new axis-aligned bounding boxes minimally overlaps the suggested splitting plane M 418. The resulting tree is very similar to the corresponding 3D-tree, however, since the object sets are partitioned rather than space, the resulting tree is much flatter. Another approach is to select the R-plane and L-plane in such a way that the overlap of child boxes is minimal and the empty space is maximized if possible. It should be noted that for some objects axis-aligned bounding boxes are inefficient. An example of such a situation is a long cylinder with small radius on the diagonal of an axis-aligned bounding box.

Figure 10:
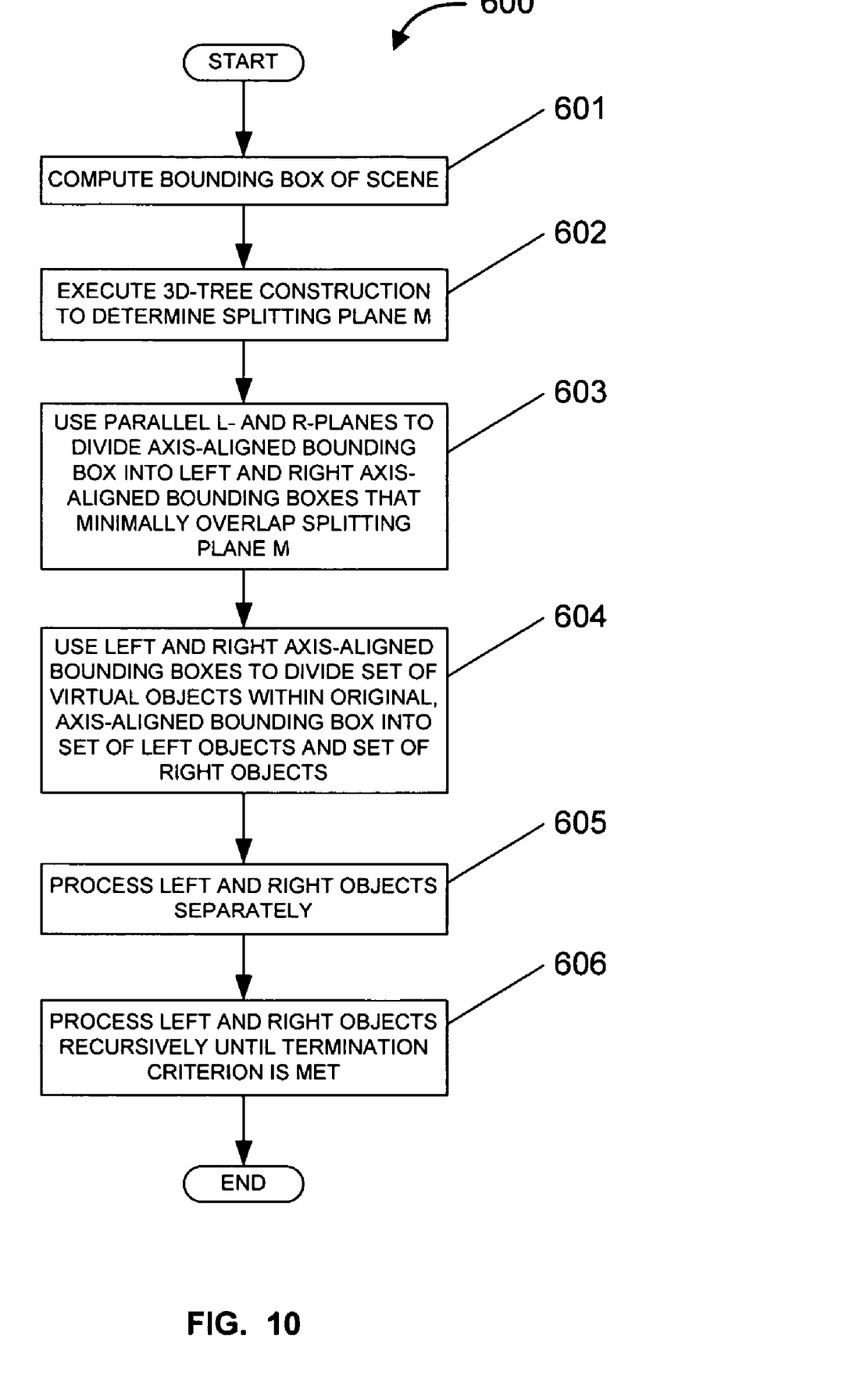

FIG. 10 is a flowchart of a method 600 according to this aspect of the invention. In step 601, a bounding box of a scene is computed. In step 602, a 3D-tree construction is executed to determine a splitting plane M. In step 603, parallel L- and R-planes are used to partition the axis-aligned bounding box into left and right axis-aligned bounding boxes that minimally overlap the splitting plane M. In step 604, the left and right bounding boxes are used to partition the set of virtual objects contained within the original axis-aligned bounding box into a set of left objects and a set of right objects. In step 605, the left and right objects are processed recursively until a termination criterion is met. It should be noted that the method 600 illustrated in FIG. 10, as well as the method 200 illustrated in FIG. 3, may be combined with other techniques described herein, including techniques relating to 3D-tree construction, real-time processing, bucket sorting, self-intersection, and the like.

In the case of the 3D-tree, the spatial subdivision is continued so as to cut off the empty portions of the space around the object. In the case of the described bounding volume hierarchy, partitioning such objects into smaller ones results in a similar behavior. In order to maintain the predictability of the memory requirements, a maximum bounding box size is defined. All objects with an extent that exceeds the maximum bounding box size are split into smaller portions to meet the requirement. The maximum allowed size can be found by scanning the data set for the minimal extent among all objects.

The data structure described herein allows the transfer of the principles of fast 3D-tree traversal to bounding volume hierarchies. The cases of traversal are similar: (1) only the left child; (2) only the right child; (3) the left child and then the right child; (4) the right child and then the left child; or (5) the ray is between split planes (i.e., empty space). Since one node in the described technique is split by two parallel planes, the order of how to traverse the boxes is determined by the ray direction. FIG. 6 sets forth a source code listing incorporating the techniques described above.

Previous bounding volume hierarchy techniques could not efficiently determine the order of how to traverse the child nodes or required additional effort, such as updating a heap data structure. In addition a whole bounding volume had to be loaded and tested against the ray, while the present approach only requires the two plane distances. Checking the ray against the two planes in software seems to be more expensive, however. The traversal is the bottle neck in 3D-trees, and doing some more computation here better hides the latencies of memory access. In addition, the bounding volume hierarchy trees tend to be much smaller than corresponding 3D-trees of same performance.

Although there is herein described a new bounding volume hierarchy, there is a strong link to traversing 3D-trees: Setting L=R, the classical binary space partition is obtained, and the traversal algorithm collapses to the traversal algorithm for 3D-trees.

The described bounding volume hierarchy also can be applied to efficiently find ray freeform surface intersections by subdividing the freeform surface. Doing so allows the intersection of a freeform surface with a convex hull property and a subdivision algorithm efficiently to be computed up to floating point precision, depending on the actual floating point arithmetic. A subdivision step is performed, for example, for polynomial surfaces, rational surfaces, and approximating subdivision surfaces. For each axis in space the possibly overlapping bounding boxes are determined as discussed above. In case of a binary subdivision, the intersection of the L-boxes and the intersection of the R-boxes for new bounding boxes of the new meshes. Now the above-described traversal can be efficiently performed, since the spatial order of the boxes is known. Instead of pre-computing the hierarchy of bounding volumes, it can be computed on the fly. This procedure is efficient for freeform surfaces and allows one to save the memory for the acceleration data structure, which is replaced by a small stack of the bounding volumes that have to be traversed by backtracking. The subdivision is continued until the ray surface intersection lies in a bounding volume that collapsed to a point in floating point precision or an interval of a small size. Section 2.1.1 of the Appendix sets forth a code listing in accordance with this aspect of the invention.

Using regular grids as an acceleration data structure in ray tracing is simple, but efficiency suffers from a lack of spatial adaptivity and the subsequent traversal of many empty grid cells. Hierarchical regular grids can improve on the situation, but still are inferior as compared to bounding volume hierarchies and 3D-trees. However, regular grids can be used to improve on the construction speed of acceleration data structures. The technique for constructing the acceleration data structures are similar to quick sorting and are expected to run in O(n log n). An improvement can be obtained by applying bucket sorting, which runs in linear time. Therefore the axis-aligned bounding box of the objects is partitioned into $n_x \times n_y \times n_z$ axis-aligned boxes. Each object then is sorted into exactly one of these boxes by one selected point, e.g., the center of gravity or the first vertex of each triangle could be used. Then the actual axis-aligned bounding box of the objects in each grid cell is determined. These axis-aligned bounding boxes are used instead of the objects they contain as long as the box does not intersect one of the division planes. In that case the box is unpacked and instead the objects in the box will be used directly. This procedure saves a lot of comparisons and memory accesses, noticeably improves the constant of the order of the construction techniques, and also can be applied recursively. The above technique is especially appealing to hardware implementations, since it can be realized by processing a stream of objects.

The acceleration data structures can be built on demand, i.e., at the time when a ray is traversing a specific axis-aligned bounding box with its objects. Then on the one hand the acceleration data structure never becomes refined in regions of space, which are invisible to the rays, and caches are not polluted by data that is never touched. On the other hand after refinement the objects possibly intersected by a ray are already in the caches.

From the above discussion, it will be seen that the present invention addresses long known issues in ray tracing and provides techniques for ray tracing having improved precision, overall speed and memory footprint of the acceleration data structures. The improvements in numerical precision transfer to other number systems as well as, for example, to the logarithmic number system used in the hardware of the ART ray tracing chips. It is noted that the specific implementation of the IEEE floating point standard on a processor or a dedicated hardware can severely influence performance. For example, on a Pentium 4 chip denormalized numbers can degrade performance by a factor of 100 and more. As discussed above, an implementation of the invention avoids these exceptions. The view of bounding volume hierarchies described herein makes them suited for realtime ray tracing. In an amortized analysis, the described techniques outperform the previous state of the art, thus allowing more precise techniques to be used, for example, for computing motion blur in fully animated scene, as in a production setting or the like. It will be apparent from the above discussion that the described bounding volume hierarchies have significant advantages when compared with 3D-trees and other techniques, particularly in hardware implementations and for huge scenes. In an amortized analysis, the described bounding volume hierarchies outperform current 3D-trees by at least a factor of two. In addition, the memory footprint can be determined beforehand and is linear in the number of objects.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A method executable in a computer processor, the computer processor comprising computer hardware and being operable to generate a pixel value for a pixel in an image, the pixel value being representative of a point in a scene as recorded on an image plane of a simulated camera, the computer processor being configured to generate the pixel value for an image using a selected ray-tracing methodology, the selected ray-tracing methodology comprising the use of a ray tree, the ray tree including at least one ray shot from the pixel into a scene along a selected direction, the ray-tracing methodology further comprising the calculating of the intersections of rays and surfaces of objects in the scene, the method comprising:

calculating intersections of rays and objects in the scene by utilizing bounding volume hierarchies, the calculating comprising:

defining, utilizing, and recursively and adaptively refining an axis-aligned bounding box to locate, for a given ray, the point of ray/object intersection nearest the origin of the ray, and continuing the refinement of the axis-aligned bounding box until a predetermined termination criterion is met, wherein the defining of an axis-aligned bounding box comprises determining parallel L-and R-planes to partition a set of virtual objects within the axis-aligned bounding box into a set of left objects and a set of right objects and to thereby define two axis-aligned bounding boxes by the two parallel planes, and further comprising processing the left and right objects recursively until the termination criterion is met, and wherein the determining of L- and R-planes comprises:
determining a splitting plane M by execution of a 3D-tree construction, the 3D-tree construction being based upon coordinates of triangles into which surfaces in the scene are partitioned, and
partitioning the objects such that the overlap of the resulting L- and R-planes of the axis-aligned bounding boxes minimally overlaps the splitting plane M.

2. The method of claim 1 wherein the execution of a 3D-tree construction comprises:
determining candidates for splitting planes based on coordinates of triangle vertices inside the axis-aligned bounding box that should be partitioned, and
from the set of candidates, selecting the plane nearest the center of the longest side of the current axis-aligned bounding box.

3. The method of claim 2 wherein the selecting further comprising:
selecting only coordinates of triangles whose longest component of the surface normal matches the normal of the potential splitting plane.

4. The method of claim 2 further comprising:
determining whether a triangle intersecting the splitting plane is contained in the left or right partition of an axis-aligned bounding box, the determining comprising first computing the intersection of the triangle with the splitting plane to generate an "intersection line", and then determining how the intersection line is situated relative to the rectangle defined by the intersection of the splitting plane and the bounding box.

5. The method of claim 4 further comprising determining an order of traversal of bounding volume hierarchies based on ray direction.

6. The method of claim 5 wherein a hierarchy of bounding volumes is computed in real time, as required to process an image.

7. The method of claim 6 further comprising:
constructing an acceleration data structure for ray tracing based on bucket sorting, the construction comprising:
partitioning the axis-aligned bounding box of objects into $n_x \times n_y \times n_z$ axis-aligned boxes,
sorting each object into exactly one of the boxes by one selected point, the selected point including any of the center of gravity or the first vertex of each triangle, and
determining the axis-aligned bounding box of the objects in each grid cell.

8. The method of claim 2 further comprising subdividing bounding boxes.

9. The method of claim 2 further wherein execution of a 3D-tree construction further comprises executing tree pruning by left-balancing from a selected depth, the tree pruning comprising pruning tree depth by approximately left-balancing the binary space partition starting from the selected depth.

10. A method executable in a computer processor the computer processor comprising computer hardware and being operable to generate a pixel value for a pixel in an image, the pixel value being representative of a point in a scene as recorded on an image plane of a simulated camera, the computer processor being configured to generate the pixel value for an image using a selected ray-tracing methodology, the selected ray-tracing methodology comprising the use of a ray tree, the ray tree including at least one ray shot from the pixel into a scene along a selected direction, the ray-tracing methodology further comprising the calculating of the intersections of rays and surfaces of objects in the scene, the method comprising:
calculating intersections of rays and objects in the scene by utilizing bounding volume hierarchies, wherein the calculating comprises:
defining, utilizing, and recursively and adaptively refining an axis-aligned bounding box to locate, for a given ray, the point of ray/object intersection nearest the origin of the ray; and
continuing the refinement of the axis-aligned bounding box until a predetermined termination criterion is met;
wherein the defining, utilizing and recursively and adaptively refining comprises:
selecting the corner of a bounding box closest to the surface normal in the center of the box, and using the point corresponding to the selected corner to start a secondary ray, and
utilizing a 3D-tree construction, the construction comprising executing tree pruning by left-balancing from a selected depth, the tree pruning comprising pruning tree depth by approximately left-balancing the binary space partition starting from the selected depth;
wherein the defining of an axis-aligned bounding box comprises:
(a) determining parallel L- and R-planes to partition a set of virtual objects within the axis-aligned bounding box into a set of left objects and a set of right objects and to thereby define two axis-aligned bounding boxes by the two parallel planes, the determining of L- and R-planes comprising determining a splitting plane M by execution of a 3D-tree construction, the 3D-tree construction being based upon coordinates of triangles into which surfaces in the scene are partitioned, and
(b) partitioning the objects such that the overlap of the resulting L- and R-planes of the axis-aligned bounding boxes minimally overlaps the splitting plane; and
further comprising processing the left and right objects recursively until the termination criterion is met,
wherein in step (a) the execution of a 3D-tree construction comprises:
(a1) determining candidates for splitting planes based on coordinates of triangle vertices inside the axis-aligned bounding box that should be partitioned, and
(a2) from the set of candidates, selecting the plane nearest the center of the longest side of the current axis-aligned bounding box, the selecting further comprising selecting only coordinates of triangles whose longest component of the surface normal matches the normal of the potential splitting plane; and
wherein the bounding volume hierarchies are constructed in real-time, on an on-demand basis.

* * * * *